March 20, 1956     R. C. TRESEDER ET AL     2,738,843
TURBINE PROPELLER CONTROL SYSTEM
Filed Feb. 25, 1953
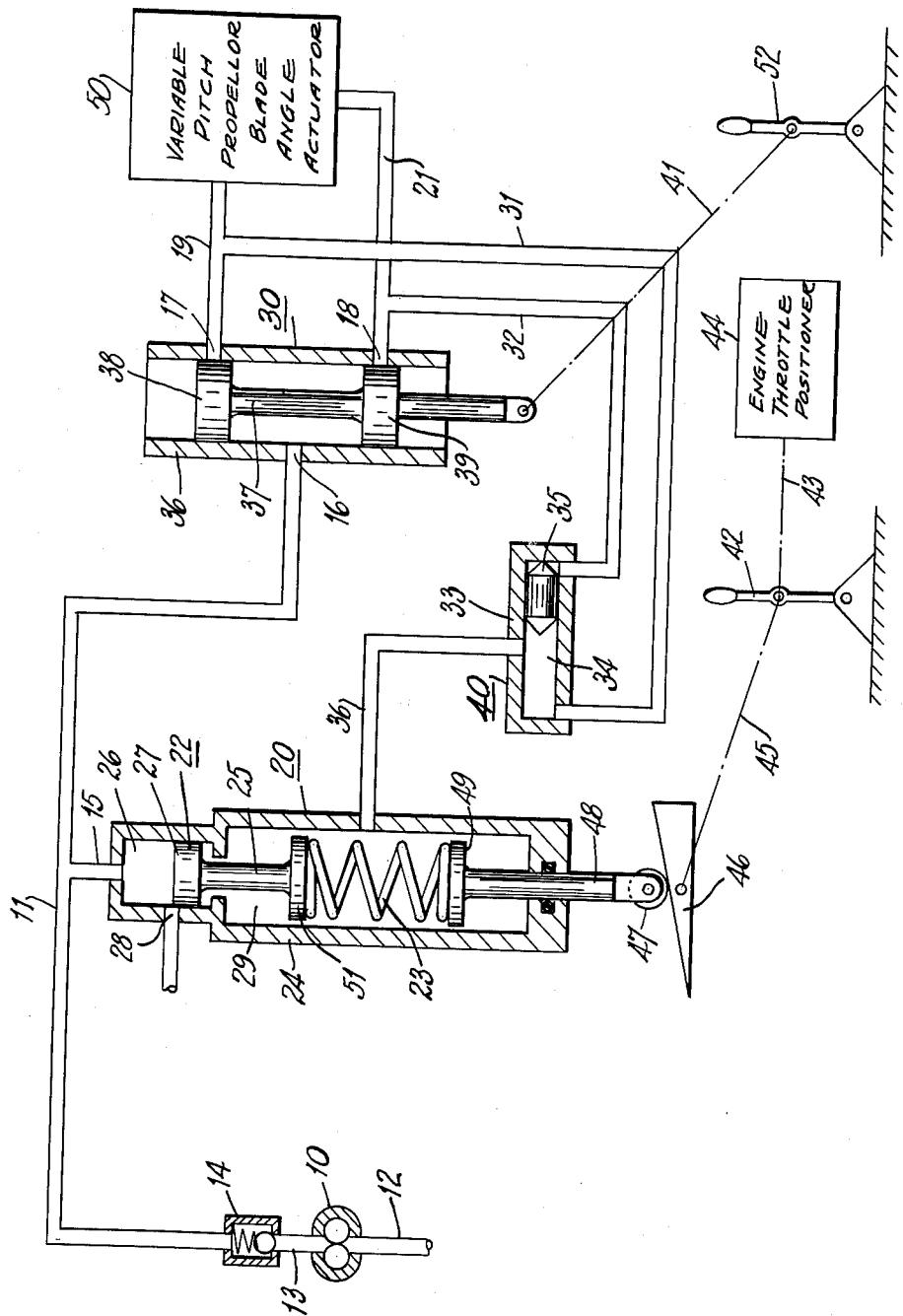
INVENTOR.
MORTON BROOKS
RICHARD E. MOORE
ROBERT C. TRESEDER
BY Willits, Hardman and John
ATTORNEYS

United States Patent Office 2,738,843
Patented Mar. 20, 1956

2,738,843

TURBINE PROPELLER CONTROL SYSTEM

Robert C. Treseder and Morton Brooks, Dayton, Ohio, and Richard E. Moore, Los Angeles, Calif., assignors to General Motors Corporation, Detroit, Mich., a corporation of Delaware Application February 25, 1953, Serial No. 338,758

8 Claims. (Cl. 170—135.74)

The present invention relates to a control system for an engine-propeller combination, and more particularly to a method and means for controlling a turbine driven variable pitch propeller.

In aircraft propelled by turbine propeller combinations it is often necessary for the pilot to make split second decisions and instantaneous manipulations of the controls to avoid mishap. An error due to misjudgment or inadvertence in some instances may result in damage to the craft. In an effort to obviate some of these difficulties and at least mitigate the necessity of critical control manipulations, this invention allows the pilot additional time to correct for engine malfunctions, such as failure, that occur during critical operating conditions, for example, when taking off from a landing surface. Accordingly, our objects include the provisions of a method and means for controlling the possible rate of blade angle change in accordance with the throttle position, and the further provision of such means enabling higher rates of blade angle change at partially open throttle and lower rates of blade angle change at fully open throttle.

The aforementioned and other objects are accomplished in the present invention by providing means whereby the pressure differential between a source of pressure fluid and servo actuated means for changing blade angle, which differential determines the possible rate of blade angle change, is dependent upon the throttle position as determined by a master control lever. Specifically, the invention comprehends the provision of pressure control means in a fluid pressure system for controlling and effecting variation of the blade pitch position in a variable pitch propeller. The fluid pressure system for altering the blade pitch position includes a source of fluid under pressure, pressure controlling means, blade actuating servo means and valve means for controlling the flow of fluid, such as oil, to and from the servo means. The rate of blade angle change, in the disclosed embodiment, is dependent upon the potential of pressure applied to the servo means. In this type of system the rate of blade angle change may be altered by varying the pressure differential existent between the source of pressure fluid and the blade servo means. The rate of blade angle change will be maximum when the aforesaid differential is high and minimum when the differential is low. This phenomenon occurs by reason of the pressure differential being dependent upon the cumulative pressure drops resultant from flow through the system in accordance with well known principles of hydraulics.

In the present invention the pressure controlling means constitutes a valve having means for varying the spring load thereon in accordance with the position of a coordinated master control lever, the position of which is determinative of engine power and the engine throttle position. In this regard the spring load is increased at partially open throttle and decreased at fully open throttle, as will appear more fully hereinafter.

Further objects and advantages of the present invention will be apparent from the following description in which the drawing represents a schematic diagram of a fluid pressure system constructed in accordance with this invention.

With particular reference to the drawing, it will be apparent that the present invention is exemplified in conjunction with a fluid pressure system for controlling and effecting changes in the blade angle position of a variable pitch propeller having a pump 10 as the source of pressure fluid, a pressure controlling valve assembly 20, a distributor valve 30 and a shuttle valve 40, which are interconnected by passages to form a circuit for directing fluid flow to and from a blade angle actuator or servo means 50. Structurally, the fluid pressure system and blade angle actuator may take the form shown in the Blanchard et al. Patents 2,307,101 and 2,307,102. It is to be understood that the method envisaged by the present invention is independent of the particular fluid pressure system herein disclosed in that variation in the rate of blade angle change, measured in degrees of blade movement about their longitudinal axes per second, can be obtained by other means, reference to which will be alluded to hereinafter.

As aforementioned, the problem sought to be solved by this invention is to provide a control system for a turbine driven variable pitch propeller which will provide the pilot with additional time to correct for engine failures that occur during critical operating conditions. The critical operating condition may, for example, occur when the aircraft is taking off, at which time, the throttle is ordinarily fully open. If the engine should fail with the throttle fully open during a take off and the propeller is under the control of a governor, such as that disclosed in Serial No. 94,984, filed May 24, 1949, in the name of Dinsmore et al., the governor would automatically tend to decrease the propeller pitch at the maximum rate of blade angle change permitted by the fluid pressure system. In installations of this character no means are provided for varying the maximum rate of blade angle change in accordance with throttle position. Accordingly, the pilot must immediately sense the engine failure and render the governor inoperative in order to avoid mishap. However, by following the teachings of this invention, additional time for the pilot to consider what step is to be taken will be provided by correlating the possible rate of blade angle change with the engine throttle position.

In accordance with the well known principles of hydraulic flow through a system including tubes and orifices, the pressure losses caused by flow through a system are proportional to the velocity of flow in the system. As the rate of blade angle change in degrees per second is dependent upon the quantity of flow to the blade angle changing servo means, it is apparent that the pressure drop through the system is likewise proportional to the rate of blade angle change. Accordingly, in a pressure system having a source of fluid under pressure interconnected through valves with a servo unit or actuator, the rate of movement of the actuator will be maximum when the pressure differential between the source of supply and the servo means is high, and the rate will be minimum when the differential is low.

In the disclosed embodiment the pressure differential between the source of supply and the blade actuating servo means is controlled in accordance with the throttle position of the engine by varying the spring load in a pressure control valve assembly. In accordance with the disclosed embodiment the spring load is less at full throttle than it is at partially open throttle. However, it is apparent that other means would perform equally as well in carrying out the disclosed method, such as controlling the orifice or port openings of a distributor valve in accordance with throttle position, or utilizing a variable displacement pump as the source of fluid under pressure. It is readily apparent that if smaller orifice openings are permitted at partially open than are permitted at fully open throttle, the pressure differential between the source of supply and the servo means will likewise vary inversely with the throttle position. Moreover, if the pump displacement is greater than at partially open throttle than at fully open throttle, the pressure differential between the source of supply and the servo means will likewise vary inversely with regard to the throttle position.

Referring again to the drawing, the pump 10 operates continuously to supply fluid under pressure to trunk line 11 during propeller rotation. The pump 10 has an inlet passage 12, which connects with a suitable reservoir, not shown, and an outlet passage 13 connected through a check valve 14 to the trunk line 11. Trunk line 11 communicates with the pressure control valve assembly 20 through line 15, and also communicates with a supply port 16 of the distributor valve 30. Control ports 17 and 18 of the distributor valve 30 are connected, respectively, by lines 19 and 21 to opposed chambers of blade actuating servo means 50.

The pressure existent in trunk line 11 is controlled by the pressure control valve assembly 20, which embodies an equal area valve 22 having a variably loaded spring 23. The equal area valve 20 is housed in a casing 24 and comprises a plunger 25 normally urged by the spring 23 toward the upper end of housing 24, as shown in the drawing. Line 15 communicates with a chamber 26 in casing 24 within which a land 27 of the plunger 25 is disposed. Chamber 26 has a relief port 28 therein which relief port may be closed by upward movement of the plunger 25 under the urge of spring 23. The amount which relief port 28 is open determines the pressure existent in trunk line 11. That is, if the relief port 28 is fully closed by land 27, the pressure existent in trunk line 11 will be equal to the pressure output of pump 10. However, the pressure potential existent in trunk line 11 will be reduced proportionally to the opening of port 28 permitted by land 27. Pressure fluid in chamber 26 of casing 24 tends to move the plunger 25 downwardly, as viewed in the drawing, so that land 27 will open relief port 28, by acting on the upper surface of land 27. However, downward movement of the plunger 25 is opposed by the combined forces of spring 23 and pressure fluid existent in chamber 29, which acts on the lower surface of land 27, the upper and lower surfaces of land 27 being of equal area.

The pressure potential existent in chamber 29 of the equal area valve assembly is the higher of the pressures existent in either lines 19 or 21, which connect the distributor valve 30 to the servo means 50. Lines 19 and 21 are connected, respectively, by lines 31 and 32 to opposite sides of the shuttle valve 40, which comprises a valve casing 33 having a chamber 34, which in a shuttle valve member 35 is positioned under the urge of the pressure fluid existent in either of lines 31 or 32. The higher of the pressures existent in lines 19 and 21 will be transmitted through either of lines 31 or 32 to the chamber 34 from whence it will be transmitted through line 36 to the chamber 29 of the pressure control valve assembly 20. The pressure in chamber 29 of the pressure control valve assembly 20 assists the spring 23 in urging the plunger 25 upwardly in a manner tending to close port 28. However, upward movement of the plunger 25 is opposed by the pressure potential existent in trunk line 11 as communicated to chamber 26 by line 15. Thus, the demand for pressure fluid by the servo means 50 is transmitted to the equal area valve 22 to actuate the equal area valve so that the pressure requirements of the unit 50 in carrying out its control function will be met by the pump 10.

Flow from the trunk line 11 to opposed chambers of the servo means 50 is controlled by the distributor valve 30 which includes a valve guide 36 having the supply port 16 and the control ports 17 and 18. Disposed within the valve guide 36 is a valve plunger 37 having spaced lands 38 and 39, which cooperate respectively with control ports 17 and 18 to control the flow of fluid therethrough. The plunger 37 is connected by a mechanical linkage 41 to a blade angle control lever 52. A master control lever 42 is connected by a linkage 43 to an engine throttle positioner 44, as well as by linkage 45 to a cam surface 46.

Cam surface 46 is engaged by a cam follower 47 attached to a rod 48 which extends through the casing 24, and has a platform 49 disposed within the chamber 29. One end of the spring 23 seats against the upper surface of platform 49, while the other end of spring 23 seats against the lower surface of a platform 51 formed on the plunger 25. It is readily apparent that lineal movements of the cam surface 46 will result in varying the load on spring 23 of the pressure control valve assembly 20. In the instant disclosure the load on spring 23 is increased by moving cam surface 46 to the left when the master control lever 42 is moved to reduce the opening of the engine throttle through the throttle positioner 44 of an engine driving the propeller, not shown. Conversely, when the lever 43 is moved to increase the throttle opening of the engine, the load on spring 23 is decreased by moving the cam surface 46 to the right, as viewed in the drawing. As hereinbefore mentioned, normally propeller pitch is automatically controlled by governor means which may be of the type shown in the aforementioned copending application. These governing means control fluid flow from trunk line 11 to lines 19 and 21 leading to the servo means 50 independent of the distributor valve 30. However for simplification, only the distributor valve 30 is shown in the drawing in order to point out the invention with greater particularity.

In operation, with the control lever 42 set at fully open throttle position, the load on spring 23 will be at a minimum. Accordingly, the pressure transmitted to chamber 29 of the pressure control valve assembly 20 will be unable to effect movement of plunger 25 sufficient to fully close relief port 28. Thus, the pressure differential between trunk line 11 and either lines 19 or 21 will be at a minimum and, accordingly, the possible rate of blade angle change will be minimum. In this instance should an engine failure occur, additional time will be afforded the pilot whereby he may manipulate control lever 52 to actuate the distributor valve plunger 37 to effect movement of the propeller blades to the desired position. As the throttle controlled by lever 42 is moved toward the closed position, the load on spring 23 will be gradually increased whereupon the pressure existent in chamber 29 will be assisted to a greater degree by the spring 23 in tending to move the plunger 25 to a position where land 27 will close relief port 28. As critical operating conditions with a turbine propeller combination generally occur at fully open throttle, there is no necessity for providing additional time for the pilot to deliberate should the engine fail at partially open throttle. Accordingly, the pressure differential between trunk line 11 and either of trunk lines 19 or 21 may be increased to a maximum value by the closure of relief port 28 by land 27 when the throttle is partially open. In this manner the maximum possible rate of blade angle change is available when the engine throttle is only partially opened.

From the foregoing it is apparent that this invention discloses a method and one form of apparatus for controlling the possible rate of blade angle change according to the throttle position of an engine. This system, which allows higher rate of blade angle change at partially open throttle and lower rates of blade angle change at fully open throttle is thought to present a practical solution to one of the problems existent in turbine propeller combinations.

While the embodiment of the present invention as herein disclosed, constitutes a preferred form, it is to be understood that other forms might be adopted.

What is claimed is as follows:

1. In an engine propeller combination having a fluid pressure system including a source of fluid under pressure and servo actuated means for varying the blade angle position of a variable pitch propeller, and a throttle for controlling the engine, the combination including a circuit interconnecting said source and said servo actuated means, first valve means in said circuit between said source and servo actuated means for controlling the flow of pressure fluid to and from said servo actuated means, second valve means between said source and first valve means for controlling the pressure potential of fluid applied to said servo actuated means by said first valve means, and throttle position controlled means for continuously adjusting said second valve means throughout substantially the full range of throttle movement so that higher pressure potentials are permitted at partially open throttle than are permitted at fully open throttle.

2. In an engine propeller combination having a fluid pressure system including a source of fluid under pressure and servo actuated means for varying the blade angle position of a variable pitch propeller, and a throttle for controlling the engine, the combination including a circuit interconnecting said source and said servo actuated means including a pressure line and blade angle control lines, valve means in circuit connection between the pressure line and the blade angle control lines, and throttle position controlled means for continuously varying the pressure differential between said supply line and said blade angle control lines throughout substantially the full range of throttle movement to control the rate of blade angle change in accordance with throttle position.

3. In an engine propeller combination having a fluid pressure system including a source of fluid under pressure and servo actuated means for varying the blade angle position of a variable pitch propeller, and a throttle for controlling the engine, the combination including a circuit interconnecting said source and said servo actuated means including, a pressure supply line and blade angle control lines, first valve means in circuit connection between the pressure supply line and the blade angle control lines, second valve means connected with said supply line between said source and said first valve means, said second valve means controlling the pressure potential existent in said supply line, and throttle position controlled means operatively connected with said second valve means for continuously varying the maximum obtainable pressure potential in said supply line throughout substantially the full range of throttle movement, whereby the pressure differential between said supply line and said blade angle control lines will vary inversely with engine throttle position.

4. In an engine propeller combination having a fluid pressure system including a source of fluid under pressure and servo actuated means for varying the blade angle position of a variable pitch propeller, and a throttle for controlling the engine, the combination including, a circuit interconnecting said source and said servo actuated means including a pressure supply line and blade angle control lines, first valve means in circuit connection between the pressure supply line and the blade angle control lines, second valve means connected to said pressure supply line between said source and said first valve means, said second valve means controlling the maximum obtainable pressure potential existent in said supply line and including a spring loaded member, and throttle position controlled means for continuously varying the spring load on said member throughout substantially the full range of throttle movement so that higher rates of blade angle change are permitted at partially open throttle than are permitted a fully open throttle.

5. In an engine propeller combination having a fluid pressure system including a source of fluid pressure and a fluid motor for varying the pitch position of a variable pitch propeller, and a throttle for controlling the engine, the combination including, pressure regulating means operatively connected with said source of fluid pressure and said motor and operable to control the pressure differential existent between the source of fluid pressure and the fluid motor for controlling the rate of pitch change, and means operatively interconnecting said throttle and said pressure regulating means for continuously adjusting said pressure differential throughout substantially the full range of throttle movement.

6. In an engine propeller combination having a fluid pressure system including a source of fluid under pressure and servo actuated means for varying the blade angle position of a variable pitch propeller, and a throttle for controlling the engine, the combination including, a circuit interconnecting said source and said servo actuated means, a control valve in said circuit between said source and said servo actuated means for controlling the flow of pressure fluid to and from said servo actuated means, pressure regulating means operatively connected with said source of fluid pressure and said servo actuated means and operable to control the pressure differential existent between said source and said servo actuated means for controlling the rate of pitch change, said pressure regulating means comprising a valve having opposed equal areas subjected to the pressure of said source and the pressure of said servo actuated means, and means operatively interconnecting said throttle and said pressure regulating means for continuously adjusting said pressure differential throughout substantially the full range of throttle movement.

7. The combination set forth in claim 6 wherein said pressure regulating means includes a spring acting upon said valve for biasing said valve in one direction.

8. The combination set forth in claim 7 wherein the means operatively interconnecting said throttle and said pressure regulating means comprises a throttle positioned cam and a cam follower engaging said spring for varying the stress thereof.

References Cited in the file of this patent

UNITED STATES PATENTS

| 2,550,529 | Carson et al. | Apr. 24, 1951 |
| 2,600,017 | Morris et al. | June 10, 1952 |
| 2,649,161 | Carson et al. | Aug. 18, 1953 |

FOREIGN PATENTS

| 955,854 | France | Jan. 20, 1950 |